(12) United States Patent
Blichmann

(10) Patent No.: US 7,785,003 B2
(45) Date of Patent: Aug. 31, 2010

(54) BEER BREWING THERMOMETER

(76) Inventor: John R Blichmann, 809 S. 10th St., Lafayette, IN (US) 47905

(*) Notice: Subject to any disclaimer, the term of this patent is extended or adjusted under 35 U.S.C. 154(b) by 351 days.

(21) Appl. No.: 11/222,253

(22) Filed: Sep. 8, 2005

(65) Prior Publication Data
US 2007/0053408 A1    Mar. 8, 2007

(51) Int. Cl.
*G01K 1/14* (2006.01)
(52) U.S. Cl. .................. 374/208; 374/141; 374/148; 374/100
(58) Field of Classification Search .......... 374/208, 374/158, 209, 141, 148, 100
See application file for complete search history.

(56) References Cited

U.S. PATENT DOCUMENTS

| | | | | |
|---|---|---|---|---|
| 1,986,412 A * | 1/1935 | Rudolph | ...................... | 99/336 |
| 2,558,743 A * | 7/1951 | Ford | .......................... | 374/207 |
| 2,601,784 A * | 7/1952 | Rose | .......................... | 374/195 |
| 2,652,725 A * | 9/1953 | Lamb | ......................... | 374/141 |
| 2,736,190 A * | 2/1956 | Bockelmann et al. | ...... | 73/19.06 |
| 2,743,613 A * | 5/1956 | Kebbon | ...................... | 374/207 |
| 2,759,148 A * | 8/1956 | Store | .......................... | 324/694 |
| 2,918,819 A * | 12/1959 | Freeman | .................... | 374/200 |
| 3,279,257 A * | 10/1966 | Hunt | ......................... | 374/198 |
| 3,357,251 A * | 12/1967 | Harrison | .................... | 374/204 |
| 3,431,782 A * | 3/1969 | Brophy, Jr. | ................. | 374/207 |
| 3,530,276 A * | 9/1970 | Wells | ......................... | 392/463 |
| 3,623,370 A * | 11/1971 | Busch et al. | ................ | 374/207 |
| 3,952,596 A * | 4/1976 | Patel | ......................... | 374/198 |
| 4,059,997 A | 11/1977 | Trott | | |
| 4,595,301 A * | 6/1986 | Taylor | ....................... | 374/207 |
| 5,567,053 A * | 10/1996 | Ashe | .......................... | 374/155 |
| 6,578,429 B1 * | 6/2003 | Danna et al. | ................. | 73/732 |
| D478,822 S | 8/2003 | Kaiser et al. | | |
| 6,748,849 B2 * | 6/2004 | Wilson et al. | ................ | 99/277 |
| 7,357,095 B1 * | 4/2008 | Fong et al. | .................. | 116/286 |
| 2004/0065208 A1 * | 4/2004 | Hart et al. | .................... | 99/275 |
| 2008/0000358 A1 * | 1/2008 | Goeckner et al. | ............ | 99/281 |

* cited by examiner

*Primary Examiner*—Gail Verbitsky

(57) ABSTRACT

An improved temperature measurement device to aid in the brewing of beer. The invention provides a special dial face with common brewing process temperature ranges and ideal process target temperatures, guiding the brewer through the brewing process. In addition, the invention provides an improved weldless installation means that is rigid and not prone to leaking.

20 Claims, 2 Drawing Sheets

BEER BREWING THERMOMETER

BACKGROUND

1. Field of the Invention

This invention relates generally to temperature measurement devices, specifically to thermometers for brewing beer.

2. Discussion of Prior Art

It is well known in the art to utilize various types of thermometers for monitoring temperatures in the beer brewing process. During the mashing process of beer making, or more appropriately stated, wort making (unfermented beer), precise control of temperature is vital to provide the desired flavor and level of sweetness and body desired for the finished beer. For example, if temperatures are exceeded, certain enzymes may be permanently destroyed thereby changing the desired sugar content of the wort. If certain temperatures are not reached, the level of sweetness may not be developed.

Several temperature rests are commonly utilized in the mashing process to break down proteins, create fermentable and unfermentable sugars, and separating the sugars from the grains. A dough-in step is used to mix the crushed grains and the water, typically done at 97 F to 113 F. A protein rest of approximately 113 F to 132 F is used to break down proteins. One or more saccarification rests, ranging from approximately 140 F to 162 F, allows enzymes to convert the starch of the grains into fermentable sugars. A "mash-out" is employed to stop the enzyme activity and "lock-in" the sugar profile and reduce viscosity of the mash. A sparging (rinsing) process is performed to remove the sugars from the remaining grain particles and drained into a boiling kettle for additional processing. After the fermentable sugars have been formed, they are boiled to sterilize the wort, and hops are added to provide bitterness. After boiling, the wort must be quickly cooled to room temperature so that yeast may be added to begin the fermentation process and avoid bacterial contamination from long term exposure of wort to temperatures below approximately 140 F.

If the wort is mashed at a high temperature (approximately 156 F to 162 F), a wort will be created with more unfermentable sugars resulting in a sweet finished beer. If the wort is mashed at a low temperature (approximately 140 F to 152 F), a wort will be created with few unfermentable sugars resulting in a dry finished beer. If the wort is mashed at a medium temperature (approximately 152 F to 156 F), a wort will be created with a mix of fermentable and unfermentable sugars resulting in a medium sweetness finished beer. If, after the mashing process, the grains are not heated to approximately 164 F to 169 F, the starch converting enzymes will not be destroyed and the character of the wort will continue to change. It will also make the removal of the viscous wort from the spent grains more difficult. If the sparge water temperatures are exceeded (above approximately 175 F), tannins may be leached out of the grains making the wort objectionably astringent. If the wort is not cooled to the correct temperature, yeast may be damaged, may create undesirable flavors, or encourage bacterial growth.

Some brewers purchase pre-mashed sugars called extract, which are dissolved in water and boiled as above. However, it is common to add some additional flavors to the wort to meet the brewer's requirements. A smaller portion of grains is steeped in hot water (approximately 150-162 F) and their flavors are leached into the water much like a tea bag. The grains are removed and the liquid is then transferred to the remainder of the wort. If this process is performed at too high a temperature, astringent flavors will be carried into the wort.

It is clear, then, that temperature control is vital to developing a beer matching the brewer's desires. Since there are numerous temperature rests, and wide temperature ranges for all the brewing sub processes, it is difficult for the brewer, particularly the novice, to remember and control them precisely and consistently during the busy and hectic brewing session.

It is well known in the art to install a thermometer into the boiling and mashing vessels to monitor these temperatures. However, this requires a threaded fitting to be installed the vessel wall to receive the thermometer. Typically, a hole is drilled in the wall of the vessel and a coupling is welded into the hole. The thermometer can then be installed into this fitting. Unfortunately, this fitting and welding are expensive and time consuming, particularly for a home made beermaker where access to this equipment and skill is limited. "Weldless" adapter kits are commonly available, but are prone to leaks and do not provide sufficient rigidity for a long life. A common design utilizes a pair of o-rings and a thin nut. The o-rings are sandwiched between the wall of the vessel and the nut is placed on the thermometer on the inside of the vessel. It is then tightened to compress the o-rings. However, it is difficult to keep fluids from leaking past the threaded fittings where the o-rings cannot adequately seal.

Prior art, such as Kaiser (design Pat. No. 478,822) teaches to indicate specific temperatures on a meat thermometer, but does not indicate ranges, or suggest a process to be followed. None of the prior art products teach to provide brewing temperatures, temperature ranges, or processes on the dial face. Prior art thermometers also do not teach to provide a weldless o-ring connection integrated to the thermometer mounting location.

OBJECTS AND ADVANTAGES

Accordingly, it is an object of this invention to provide a thermometer with a dial face that guides the brewer through the complicated brewing process temperatures to meet the desired wort sugar profile.

It is another object of the invention to indicate ideal or target temperatures for each of the brewing processes on the dial face.

Yet another object of this invention to provide a thermometer that does not require numerous fittings or welding to install.

Yet another object of this invention is to provide a thermometer mounting design that is rigidly and durably affixed to the brewing vessel and is not prone to leaking.

DETAILED DESCRIPTION

Figure 1:
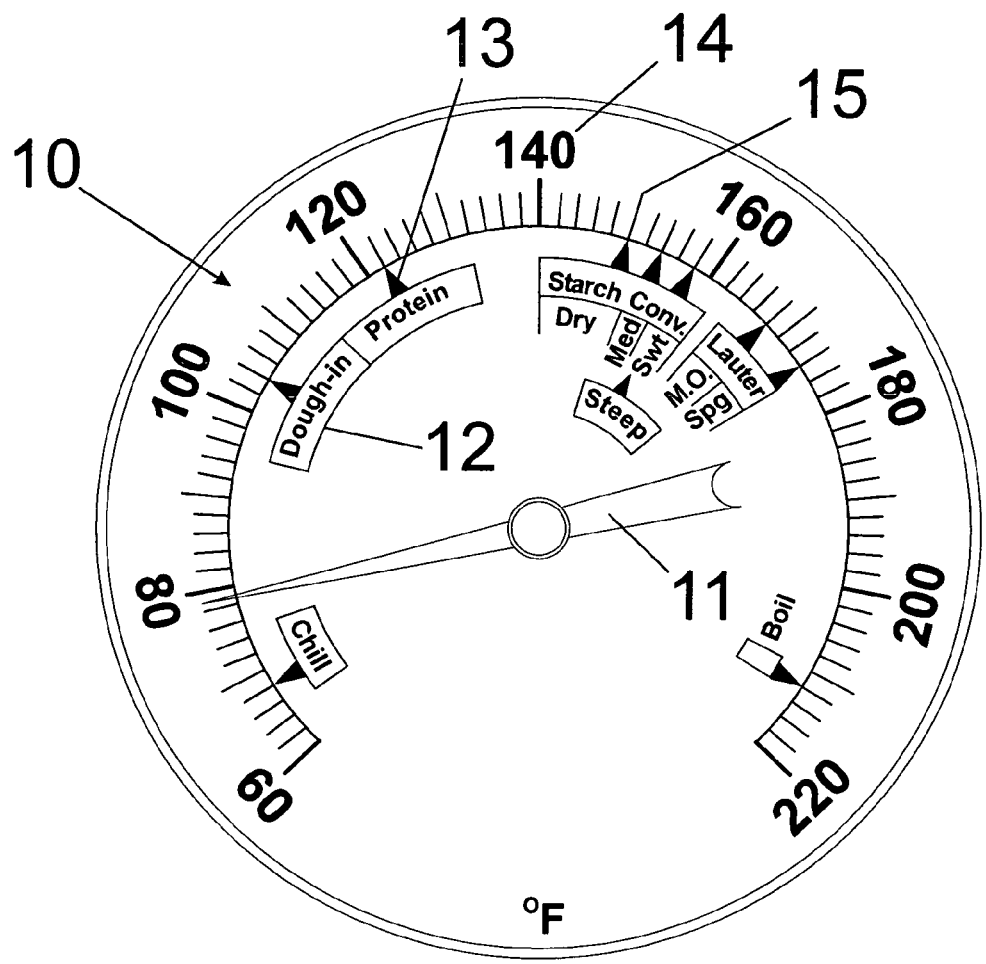
FIG. 1 shows a special dial face with the common brewing parameters and common brewing industry accepted temperature ranges.
Figure 2:
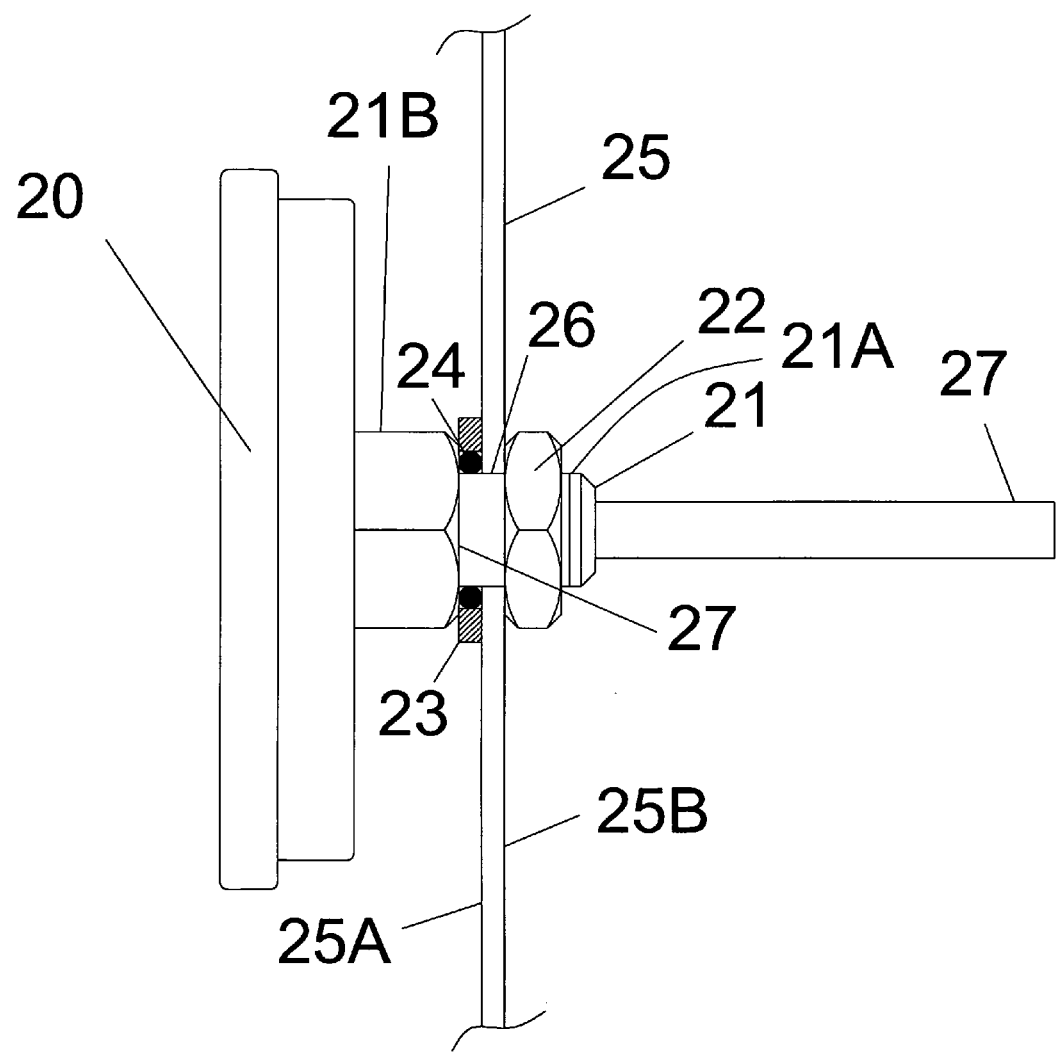
FIG. 2 shows an embodiment of the thermometer weldless mounting means.

Referring to the drawings, and particularly FIG. 1, a thermometer dial face 10 is shown. A pointer 11 is rotatably affixed to a temperature sensing element 28 as shown in FIG. 2. Referring again to FIG. 1, a plurality of numerals 14 and tick marks 15 on dial face 10 provide a means to read the output temperature when pointer 11 is in alignment with a tick mark 15 indicative of the temperature being measured. A process temperature range 12 indicates an acceptable temperature range for the plurality of brewing processes. An indicator 13 above process temperature range 12 indicates the optimal temperature for that particular process.

Referring to FIG. 2, thermometer 20 is shown installed in a brewing vessel and vessel wall 25. The vessel wall 25 forms an enclosure within the brewing vessel. Vessel wall 25 having a hole 26 for receiving a threaded fitting 21. The threaded fitting 21 has a first end or threaded end 21A and a second end or an expanded end portion 21B being spaced one from the other. The first end or threaded end 21A is positioned partially within or internally of the brewing vessel or vessel wall 25. The threaded end 21A is smaller than the expanded end portion 21B. The expanded end portion 21B is connected to the temperature sensing element 28. The expanded end portion 21B is positioned within or externally of the brewing vessel and vessel wall 25. An o-ring is installed over the threaded end 21A of the threaded fitting 21 to provide a pressure tight seal between vessel wall 25 and a fitting face 27 which is positioned on the expanded end portion 21B. The fitting face 27 separates the first end or threaded end 21A from the second end or expanded end portion 21B. An o-ring retainer is placed over o-ring 24 to encapsulate o-ring 24. A nut 22 is threaded onto the threaded end 21A of the threaded fitting 21 and tightened, compressing o-ring 24 between the vessel wall 25 and the fitting face 27 near the expanded end portion 21B sealingly positioning the seal ring in sealing and contacting relationship with each of the fitting face of the expanded end portion, the ring retainer and the vessel wall thereby creating a tight and reliable seal.

With the thermometer assembled within the vessel wall and ready to be used with the brewing process the following element relationships exist. The temperature sensing element 28 is positioned internally of the vessel wall 25 within the brewing vessel. The thermometer dial face 10 is positioned externally of the vessel wall 25 within the brewing vessel. At least a portion of the threaded end 21A is positioned internally of the vessel wall 25. And, with the nut threadedly attached to the portion of the threaded end 21A positioned internally of the vessel wall 25 within the brewing vessel the nut aligns and sealingly positions the seal ring 24 in sealing and contacting relationship with each of the fitting face 27 of the expanded end portion 21B, the seal ring retainer 23 and the vessel wall 25.

INDUSTRIAL APPLICABILITY

Referring to FIG. 1, a plurality of numerals 14 and tic marks 15 are located on dial face 10, and are appropriately spaced to indicate an accurate temperature reading when pointer 11 points to a tick mark 15. At least one process range 12 is located on dial face 10 to indicate an acceptable temperature range for that particular process. At least one indicator 13 is placed on process range 12 to indicate the optimal temperature for that particular process. Typical process for the beer brewing process are chilling, dough-in, acid rest, protein rest, starch conversion (saccarification), steep, lauter (mash-out and sparge), boil, as well as others known to those familiar with the art. Alternate embodiments include a dial face 10 with only process ranges 12 and no arrow 13. Yet another embodiment includes only indicator 13 and no process range 12, indicating optimal process temperature only. Yet another ramification includes combinations of process ranges 12 with or without indicator 13 or combinations of indicators 13 with or without process ranges 12. Obviously, numerous types of pointing shapes other than an arrow can be used to indicate optimal process temperature. Similarly, various types of acceptable process range indicators can be utilized in lieu of the preferred embodiment shown in FIG. 1. Temperature ranges and ideal temperatures are known to differ slightly in the brewing literature, so the afore mentioned ranges are to be considered reference only. Other brewing processes exist, such as acid rest, but are less common than those discussed above.

Referring to FIG. 2, thermometer 20 is shown installed in a vessel wall 25. To install thermometer 20 in vessel wall 25, an appropriately sized hole 26 must be drilled or punched in aforementioned vessel wall 25 for receiving threaded fitting 21. Before installation of thermometer 20 in vessel wall 25, an o-ring 24 is installed over the threaded end 21A of the threaded fitting 21 to provide a pressure tight seal between an outside surface 25A of the vessel wall 25 and a fitting face 27 near the expanded end portion 21B of the fitting 21. An o-ring retainer 23 is then placed over o-ring 24 to encapsulate o-ring 24. Thermometer 20 is then placed into hole 26. A nut 22 is threaded onto the threaded end 21A of the threaded fitting 21, tightened sufficiently to compress o-ring 24 and provide a fluid tight seal. In addition, the tightening of nut 22 provides a rigid installation since the o-ring can be compressed such that fitting face 27, o-ring retainer 23, vessel wall 25 and nut 22 are in direct contact with each other, thereby eliminating any wobble from the elastomeric o-ring. Alternate embodiments include eliminating o-ring retainer 23 by including an o-ring groove machined directly into fitting face 27. Yet another ramification places o-ring 24 and o-ring retainer 23 on the inside surface 25B of vessel wall 25, whereby fluid tight seal is formed between o-ring 24, inside of vessel wall 25, and fitting 21.

SUMMARY, RAMIFICATIONS, AND SCOPE

Thus the reader will see that the beer brewing thermometer guides the brewer through the brewing process eliminating the need to memorize acceptable process temperature ranges and ideal targets. While my description contains many specificities, these should not be construed as limitations of the scope of the invention, but rather as an exemplification of one preferred embodiment thereof. For example, many other variations of process range indicator shapes, ideal process temperature indicators, and other common brewing processes may be added or removed from the dial face. Accordingly, the scope of the invention should be determined not by the embodiments illustrated, but by the appended claims and their legal equivalents.

REFERENCE NUMERALS IN DRAWINGS

FIG. 1
10 dial face
11 pointer
12 process range
13 indicator
14 numerals
15 tick mark
FIG. 2
20 thermometer
21 threaded fitting
22 nut
23 o-ring retainer
24 o-ring
25 vessel wall
26 hole
27 fitting face
28 sensing element

The invention claimed is:

1. A thermometer being adapted for use with a brewing process, said brewing process including a brewing vessel comprising:
 a vessel wall being a part of said brewing vessel, said vessel wall having an inside surface and an outside surface;
 a temperature sensing element having a pointer rotatably affixed to said element, said element being positioned internally of said brewing vessel and said vessel wall; a dial face being affixed in a stationary relationship to said pointer, said dial face being positioned externally of said brewing vessel and said vessel wall;
 a fitting having an expanded end portion on which is positioned a fitting face, the entire expanded end portion being positioned internally of said brewing vessel and said vessel wall, said fitting further having a threaded end being smaller than said expanded end portion and being spaced from said expanded end portion, at least a portion of said threaded end being positioned internally of said brewing vessel and said vessel wall, said expanded end portion being connected to said element;
 a seal ring being positioned on said fitting, said seal ring being positioned in contacting relationship with said fitting face of said expanded end portion;
 a seal ring retainer being positioned about said seal ring and in direct contacting relationship with said fitting face, and
 a nut threadedly attached to said portion of said threaded end of said fitting positioned internally of said brewing vessel and said vessel wall wherein tightening of said nut aligns and sealingly positions said seal ring in sealing and contacting relationship with each of said fitting face of said expanded end portion, said seal ring retainer and said vessel wall.

2. The thermometer of claim 1 wherein said thermometer has a circular profile.

3. The thermometer of claim 2 wherein said circular profile of said thermometer being round.

4. The thermometer of claim 3 wherein said circular profile defines a center and said pointer being rotatably positioned about said center.

5. The thermometer of claim 1 wherein said dial face having a plurality of numerals thereon.

6. The thermometer of claim 1 wherein said dial face having at least one tick mark thereon.

7. The thermometer of claim 1 wherein said dial face having a plurality of temperature numerals and a process temperature range thereon.

8. The thermometer of claim 4 wherein said temperature range indicative of at least one of an acceptable temperature range for said brewing process.

9. The thermometer of claim 1 wherein said dial face having a plurality of temperature range indicative of a plurality of brewing processes.

10. The thermometer of claim 4 wherein said temperature range indicative of at least one of an acceptable temperature range for said brewing process includes an indicator indicative of an optimal temperature for said one of the brewing process.

11. The thermometer of claim 6 wherein said dial face includes an indicator for each of said plurality of temperature ranges indicative of an optimal temperature for a respective one of said brewing process.

12. The thermometer of claim 4 wherein said temperature range being defined by said brewing process.

13. The thermometer of claim 9 wherein said brewing process being at least one of Chill, Dough-in, Protein, Starch Conversion, Lauter, and Boil.

14. The thermometer of claim 13 wherein said brewing process of Starch Conversion, and Lauter being further subdivided.

15. The thermometer of claim 14 wherein said subdivision of Starch Conversion, includes Dry, Medium and Sweet.

16. The thermometer of claim 14 wherein said subdivision of Lauter includes Mash Out and Sparge.

17. A method of sealingly attaching a thermometer for use with a brewing process, said brewing process including a vessel having a vessel wall, said thermometer having a temperature sensing element having a pointer rotatably affixed to said element, said element being positioned internally of said brewing vessel and said vessel wall, a dial face being affixed in a stationary relationship to said pointer, said dial face being positioned externally of said brewing vessel and said vessel wall, and a fitting having an expanded end portion on which is positioned a fitting face, the entire expanded end portion being positioned internally of said brewing vessel and said vessel wall, said fitting further having a threaded end being smaller than said expanded end portion and being spaced from said expanded end portion, at least a portion of said threaded end being positioned internally of said brewing vessel and said vessel wall, said expanded end portion being connected to said element; said method comprising the steps of:
 positioning a hole in said vessel wall;
 positioning a seal ring on said fitting by sliding said sealing ring over said threaded end of said fitting and moving said seal ring into contacting relationship with said fitting face;
 positioning said seal ring within a cavity provided within a seal ring retainer by sliding said seal ring retainer over said threaded end of said fitting and moving said seal ring retainer into contacting relationship with said fitting face;
 positioning said threaded end of said fitting within said hole within said vessel wall assuring that said seal ring is in contacting relationship with said fitting face and within said cavity within said seal ring retainer;
 placing a nut threadedly on said portion of said threaded end positioned internally of said brewing vessel and said vessel wall of said portion of said fitting extending through said hole in said vessel wall and tightening said nut aligning and sealingly attaching said fitting of said thermometer to said vessel wall sealingly positioning said seal ring in sealing and direct contacting relationship with each of said fitting face of said expanded end portion, said ring retainer and said vessel wall.

18. The method of sealingly attaching the for use with a brewing process of claim 17 wherein said hole being previously made and exiting through said vessel wall intermediate an outside surface and an inside surface.

19. A method of sealingly attaching a thermometer for use with a brewing process, said brewing process including a vessel having a vessel wall, said thermometer having a temperature sensing element having a pointer rotatably affixed to said element, said element being positioned internally of said brewing vessel and said vessel wall, a dial face being affixed in a stationary relationship to said pointer, said dial face being positioned externally of said vessel wall, and a fitting having an expanded end portion having a fitting face thereon, the entire expanded end portion being positioned internally of said brewing vessel and said vessel wall, said expanded end portion being attached to said element and said fitting further having a threaded end being smaller than said expanded end portion and being spaced from said expanded end portion, at least a portion of said threaded end being positioned internally of said brewing vessel and said vessel wall; said method comprising the steps of:

positioning a hole in said vessel wall, said hole extending intermediate an outside surface and an inside surface;

positioning said threaded end of said fitting within said hole within said vessel wall, at least a portion of said threaded end extending though said vessel wall and being positioned internally of said brewing vessel and said vessel wall;

positioning a seal ring over said threaded end of said fitting extending through said vessel wall and moving said seal ring into contacting relationship with said inside surface of said vessel wall;

positioning said seal ring retainer over said threaded end of said fitting extending through said vessel wall and moving said seal ring retainer into contacting relationship with said seal ring and said inside surface of said vessel wall;

placing a nut threadedly on said portion of said threaded end positioned internally of said brewing vessel and said vessel wall of said portion of said fitting extending through said vessel wall;

tightening said nut on said fitting aligning and sealingly attaching said fitting of said thermometer to said vessel wall sealingly positioning said seal ring in sealing and contacting relationship with each of said inside wall of said vessel, said ring retainer and said nut.

20. The method of sealingly attaching the thermometer for use with a brewing process of claim 19 wherein said hole being previously made in said vessel wall.

\* \* \* \* \*